Oct. 20, 1959
L. COTMAN
2,908,929
CLEANING DEVICE
Filed Feb. 3, 1956
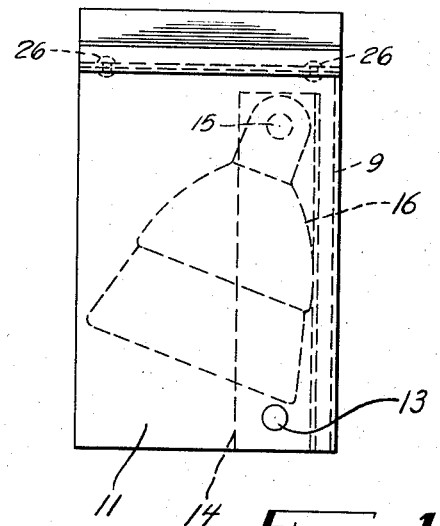
Fig. 1
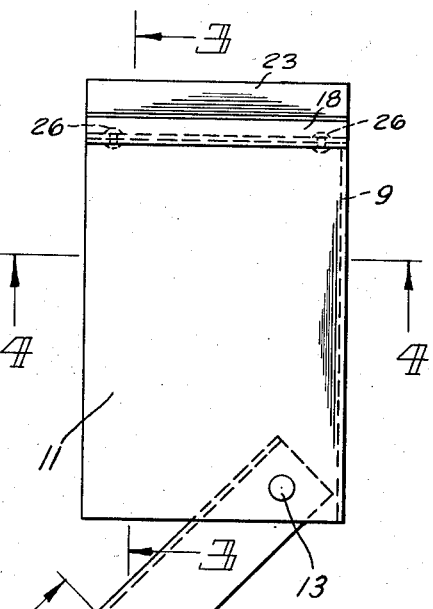
Fig. 2
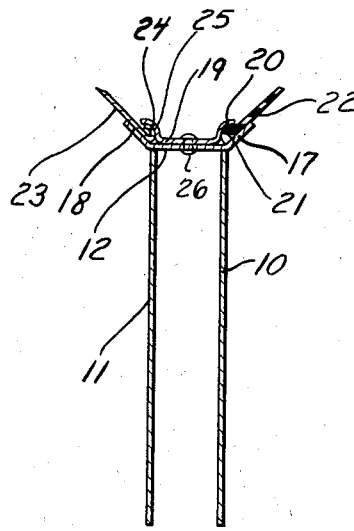
Fig. 3
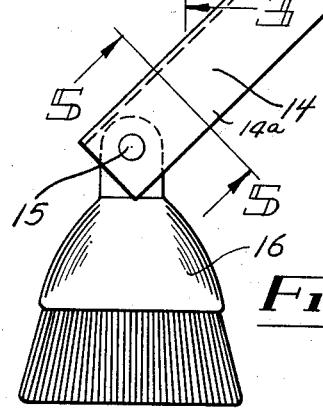
Fig. 4
Fig. 5
INVENTOR.
LAWRENCE COTMAN
BY
attorney

United States Patent Office 2,908,929
Patented Oct. 20, 1959

2,908,929

CLEANING DEVICE

Lawrence Cotman, Detroit, Mich.

Application February 3, 1956, Serial No. 563,262

1 Claim. (Cl. 15—185)

My invention relates to a new and useful improvement in a cleaning device adapted for cleaning plain surfaces. The invention is particularly adapted for use in cleaning accumulations from a vehicle windshield.

It is an object of the present invention to provide in a cleaning device of this type a rectangularly shaped hollow housing open at two adjoining sides and having attached to this housing a swingable arm on which a cleaning element is swingably mounted, and which device is so arranged and constructed that when not in use the arm and the cleaning element may be folded upon each other and swung to lie inwardly of the housing.

Another object of the invention is to provide a cleaning device of this type which may be folded into a compact size and which is so arranged and constructed that the cleaning element may be easily and quickly moved to operating position.

Other objects will appear hereinafter.

It is recognized that various modifications and changes may be made in the detail of structure illustrated without departing from the invention as claimed and it is intended that the present disclosure be considered to be but the preferred embodiment.

Forming a part of this application are drawings in which:

Fig. 1 is a side elevational view of the invention in folded form;

Fig. 2 is a side elevational view of the invention in unfolded form;

Fig. 3 is a sectional view taken on line 3—3 of Fig. 2;

Fig. 4 is a sectional view taken on line 4—4 of Fig. 2;

Fig. 5 is a sectional view taken on line 5—5 of Fig. 2.

The invention comprises a rectangularly shaped hollow housing having a rear wall 9, side walls 10 and 11, and a top wall 12, leaving the housing open at its bottom and at its front.

Extending at one end into the interior of the housing from the bottom thereof and pivoted by the pin 13, is a trough-shaped arm 14, to the free end of which is pivoted by the pin 15 a broom or cleaning element 16.

As shown in Fig. 1, the cleaning element 16 may be folded to engage between the side walls of the trough-shaped arm 14, and this trough-shaped arm 14 may be swung upwardly to lie between the walls 10 and 11.

When it is desired to use the cleaning element 16, the arm 14 may be swung outwardly through the open bottom of the housing, as shown in Fig. 2. The trough-shaped arm 14 engages at its opposite sides 14a and 14b with the inner surfaces of the sides 10 and 11, thus reinforcing this housing.

When the device is in folded form, such as shown in Fig. 1, it will occupy a minimum amount of space and can be carried in the glove compartment of a vehicle, or in any other desired location.

The cleaning member 16 which is in the form of a broom will serve as a means for removing loose snow from the various parts of the vehicle which it is desired to have cleaned, and the scraper blade 23 and the squeegee 22 serve as very effective elements in cleaning the windshield.

Experience has shown that, due to the construction described, the device is quite durable and highly efficient in use.

What I claim is:

As an article of manufacture, a cleaning device comprising: a rectangularly shaped hollow housing open at two connecting sides; an arm projecting at one end inwardly of said housing through one of said sides and swingably mounted to said housing and swingable to lie entirely within said housing, and to project outwardly therefrom; a cleaning element mounted on the free end of said swingable arm; said swingable arm being U-shaped in transverse cross section, and said cleaning element being engaged between the sides of said swingable arm; said housing being of sufficient size to entirely enclose said swingable arm and said cleaning member when swung inwardly of said housing.

References Cited in the file of this patent

UNITED STATES PATENTS

| | | |
|---|---|---|
| 949,540 | Kress | Feb. 15, 1910 |
| 1,500,852 | Shephard | July 8, 1924 |
| 2,370,414 | Ostrander | Feb. 27, 1945 |
| 2,721,346 | Mora | Oct. 25, 1955 |

FOREIGN PATENTS

| | | |
|---|---|---|
| 258,023 | Italy | Apr. 2, 1928 |